United States Patent
Lim et al.

(10) Patent No.: US 11,477,372 B2
(45) Date of Patent: Oct. 18, 2022

(54) IMAGE PROCESSING METHOD AND DEVICE SUPPORTING MULTIPLE MODES AND IMPROVED BRIGHTNESS UNIFORMITY, IMAGE CONVERSION OR STITCHING UNIT, AND COMPUTER READABLE RECORDING MEDIUM REALIZING THE IMAGE PROCESSING METHOD

(71) Applicant: LG INNOTEK CO., LTD., Seoul (KR)

(72) Inventors: Sung Hyun Lim, Seoul (KR); Dong Gyun Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 16/331,413

(22) PCT Filed: Sep. 5, 2017

(86) PCT No.: PCT/KR2017/009674
§ 371 (c)(1),
(2) Date: Mar. 7, 2019

(87) PCT Pub. No.: WO2018/048167
PCT Pub. Date: Mar. 15, 2018

(65) Prior Publication Data
US 2019/0253623 A1    Aug. 15, 2019

(30) Foreign Application Priority Data

Sep. 8, 2016  (KR) .................. 10-2016-0115912
Sep. 8, 2016  (KR) .................. 10-2016-0115913
(Continued)

(51) Int. Cl.
   H04N 5/232    (2006.01)
   H04N 5/235    (2006.01)
   (Continued)

(52) U.S. Cl.
   CPC ....... *H04N 5/23238* (2013.01); *H04N 5/2351* (2013.01); *H04N 5/2353* (2013.01);
   (Continued)

(58) Field of Classification Search
   CPC ...... H04N 5/23238; H04N 9/73; H04N 5/235; H04N 5/2351; H04N 5/2353; H04N 5/262;
   (Continued)

(56) References Cited

U.S. PATENT DOCUMENTS 10,021,295 B1 *   7/2018   Baldwin .......... H04N 5/232935
2011/0026771 A1 * 2/2011   Hsu ..................... G06K 9/00805
                                                                382/104
(Continued)

FOREIGN PATENT DOCUMENTS

CN    105196917 A    12/2015
EP     3270583 A1    1/2018
(Continued)

Primary Examiner — Christopher S Kelley
Assistant Examiner — Asmamaw G Tarko
(74) Attorney, Agent, or Firm — Birch, Stewart, Kolasch & Birch, LLP

(57) ABSTRACT

Disclosed is an image processing method including adjusting a light exposure time of an image acquisition unit by using a target image converted to be output in a desired output mode among a plurality of output modes; and displaying target images acquired according to the adjustment.

20 Claims, 12 Drawing Sheets

(30) Foreign Application Priority Data

Dec. 6, 2016 (KR) ........................ 10-2016-0165383
Dec. 6, 2016 (KR) ........................ 10-2016-0165385

(51) Int. Cl.
*H04N 9/73* (2006.01)
*H04N 5/357* (2011.01)
*H04N 9/04* (2006.01)

(52) U.S. Cl.
CPC ........... *H04N 5/3572* (2013.01); *H04N 9/045* (2013.01); *H04N 9/73* (2013.01)

(58) Field of Classification Search
CPC ........ H04N 5/2628; H04N 9/64; H04N 9/646; G06T 2207/10024
USPC ...................................... 348/36, 35
See application file for complete search history.

(56) References Cited

U.S. PATENT DOCUMENTS

| | | | |
|---|---|---|---|
| 2013/0054086 A1* | 2/2013 | Lo | B60R 1/00 701/36 |
| 2013/0208140 A1* | 8/2013 | Quast | H04N 5/23203 348/229.1 |
| 2014/0152778 A1* | 6/2014 | Ihlenburg | H04N 13/257 348/47 |
| 2014/0327774 A1* | 11/2014 | Lu | B60R 1/00 348/148 |
| 2015/0360612 A1 | 12/2015 | Lee | |

FOREIGN PATENT DOCUMENTS

| | | |
|---|---|---|
| KR | 10-2013-0117564 A | 10/2013 |
| KR | 10-1558586 B1 | 10/2015 |
| KR | 10-2015-0143144 A | 12/2015 |

\* cited by examiner

[FIG. 1]
RELATED ART
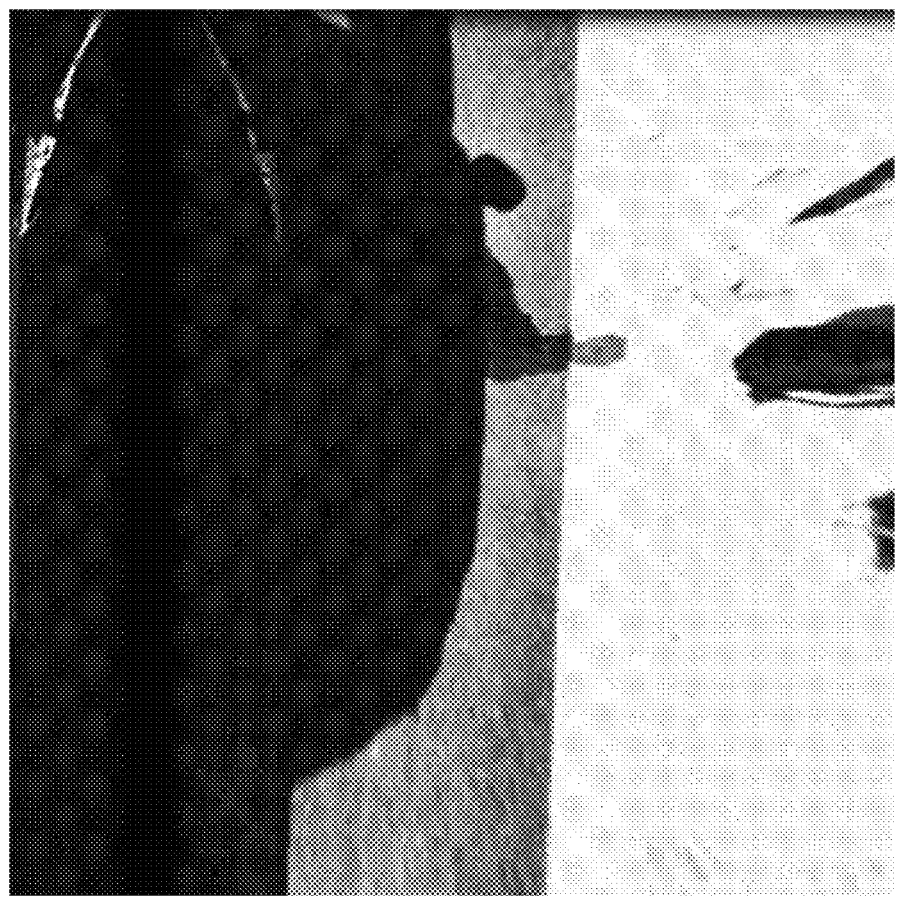

[FIG. 2]
RELATED ART
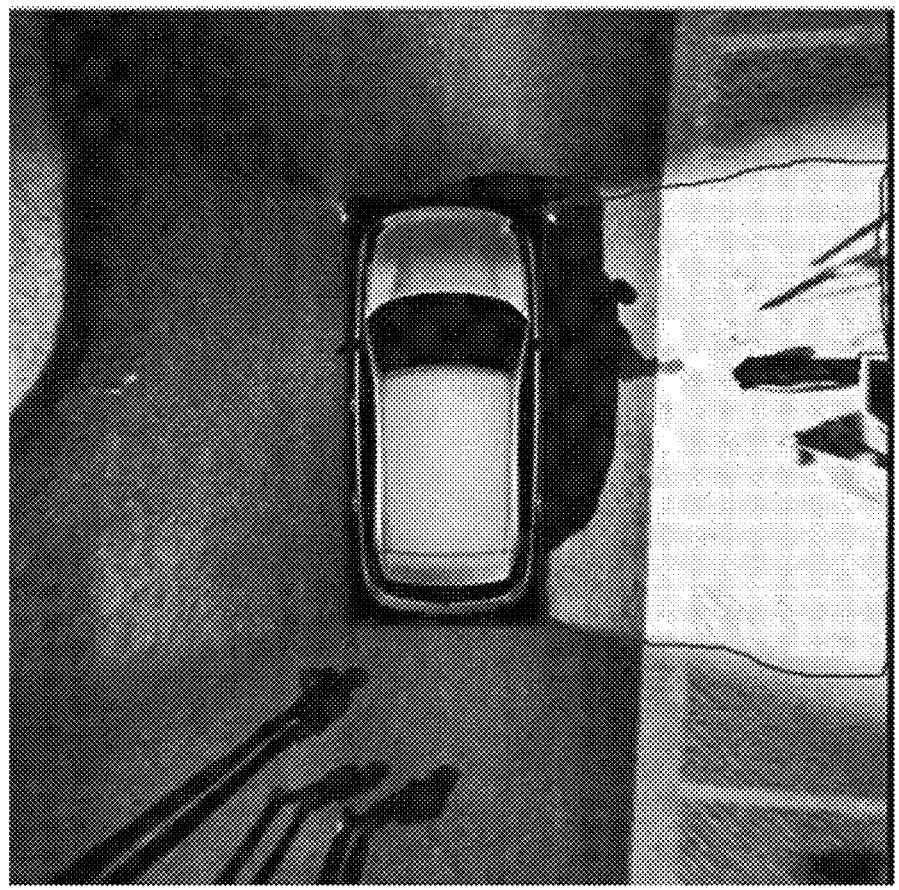

[FIG. 3]
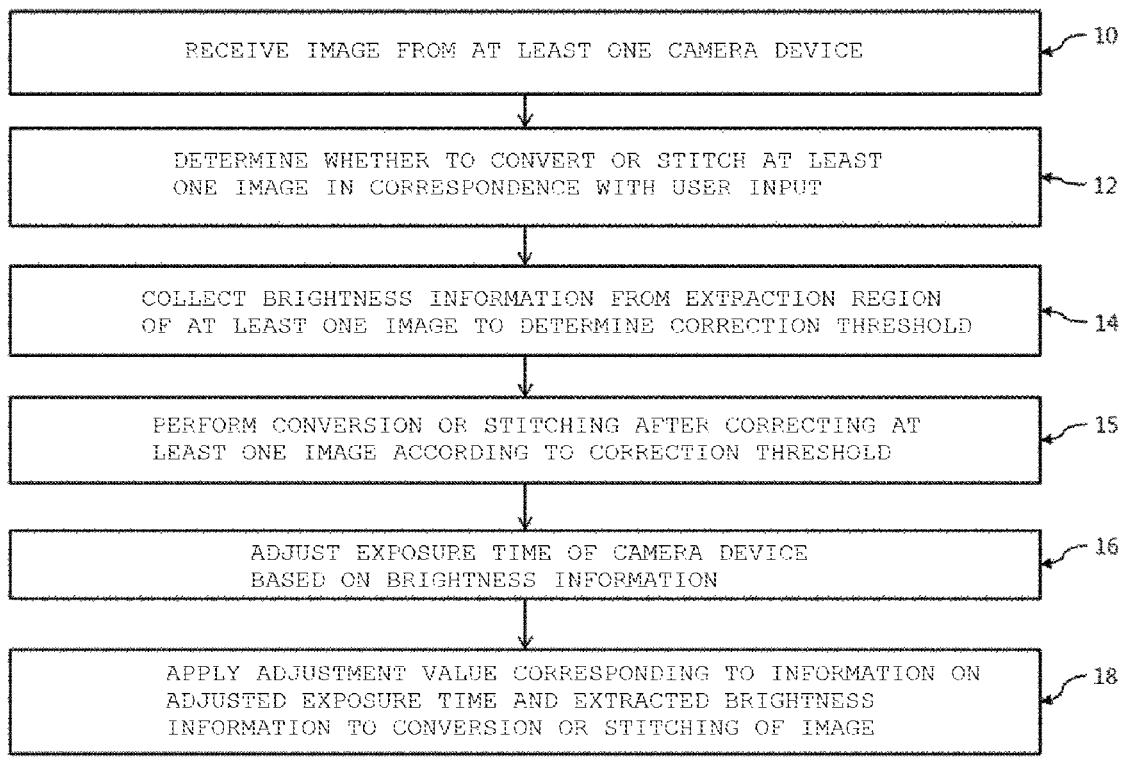

【FIG. 4】
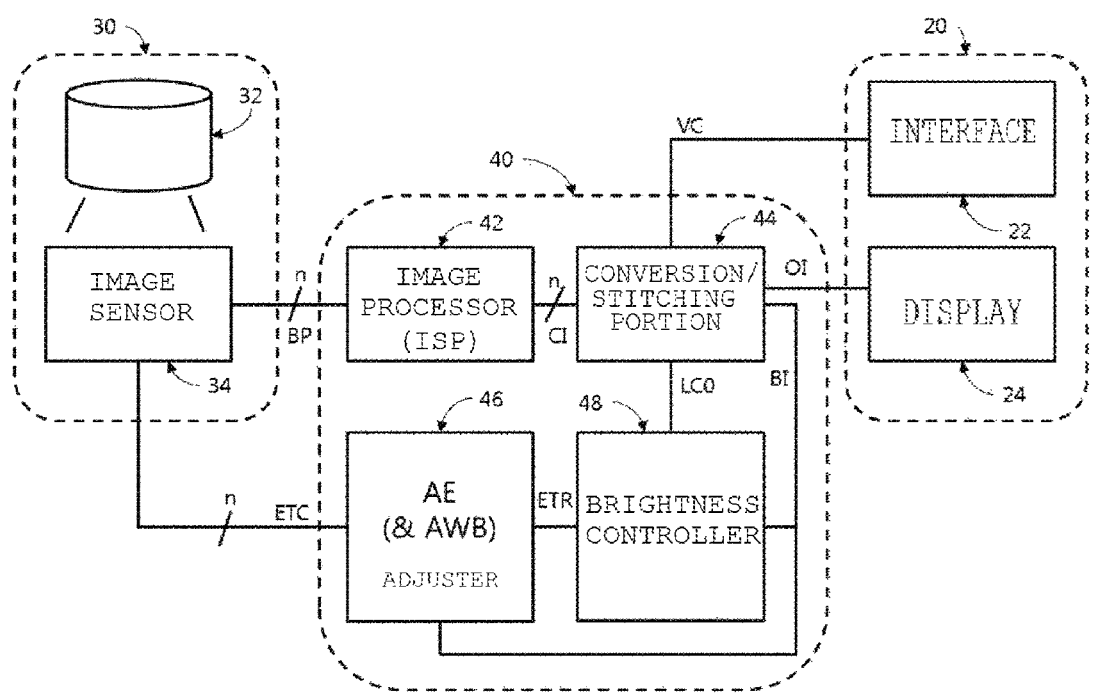

[FIG. 5]
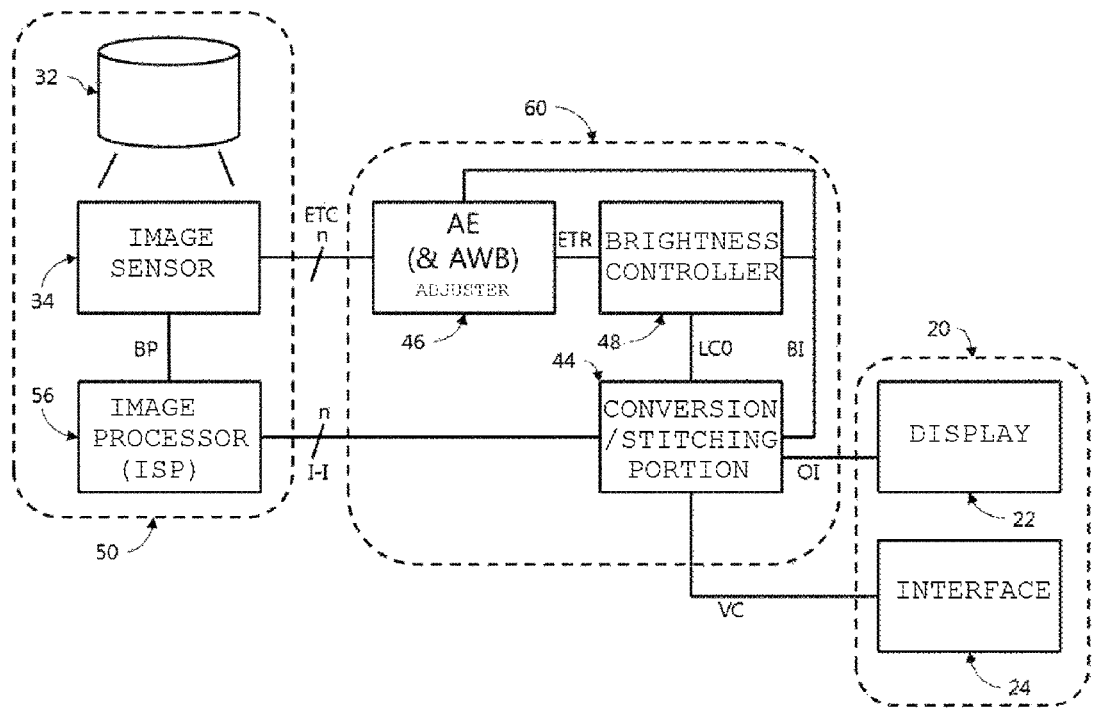
[FIG. 6]
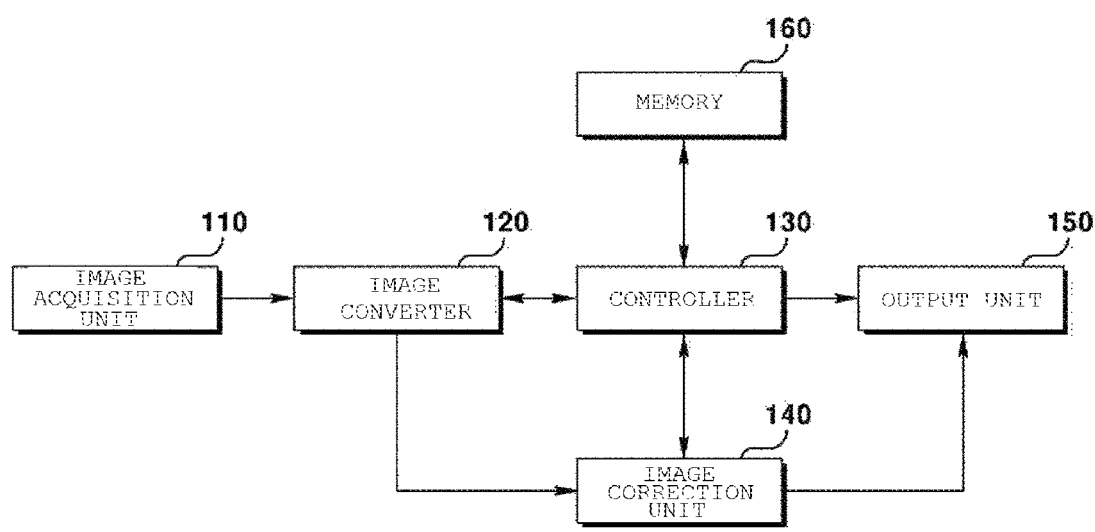

[FIG. 7]
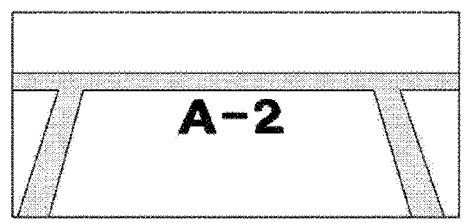
(a)
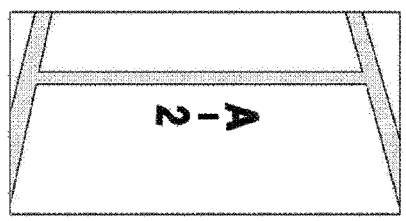
(d)
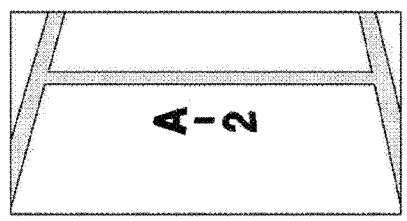
(b)
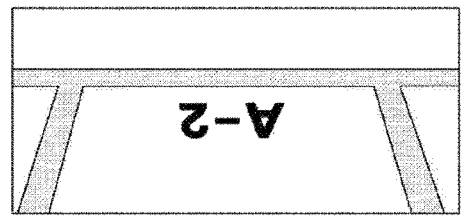
(c)

【FIG. 8】
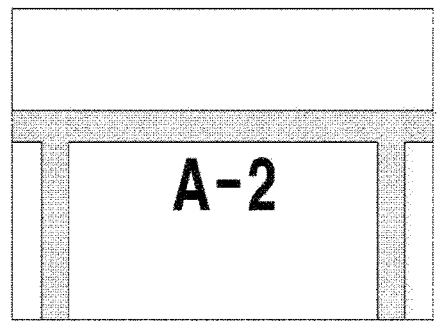
【FIG. 9】
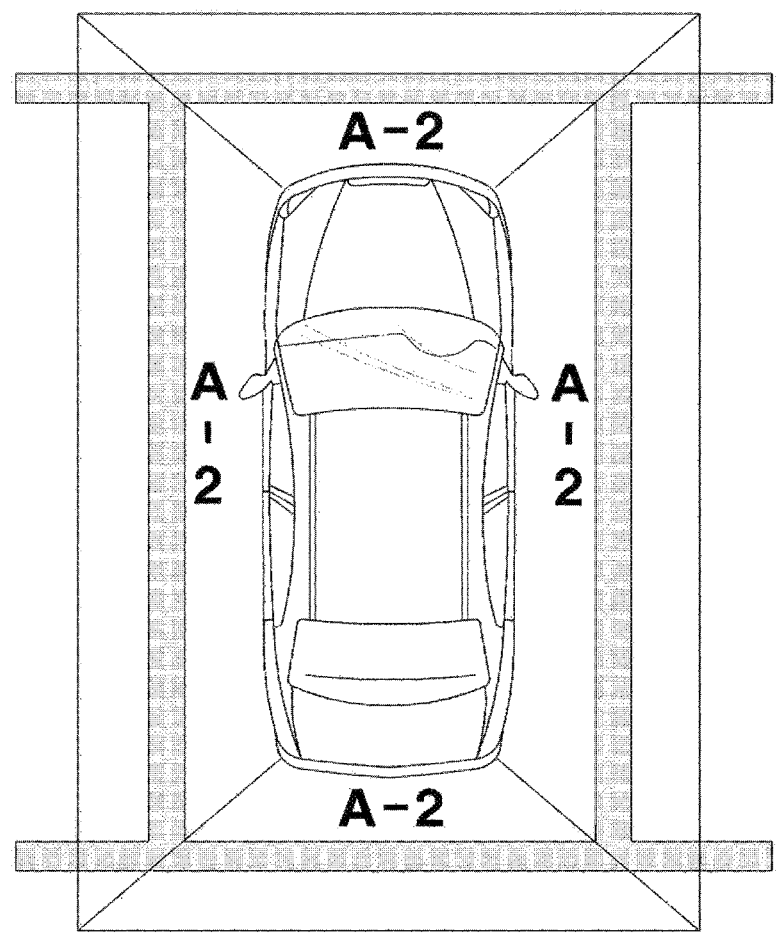

[FIG. 10]
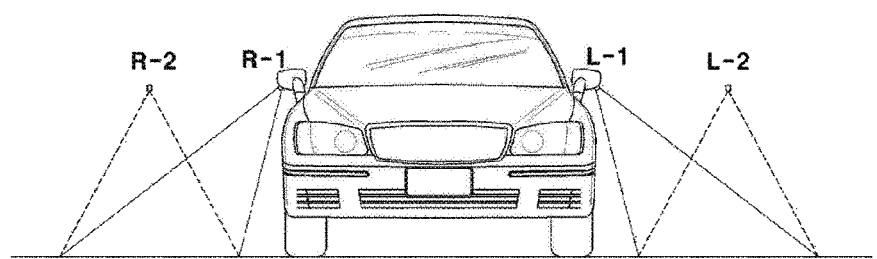

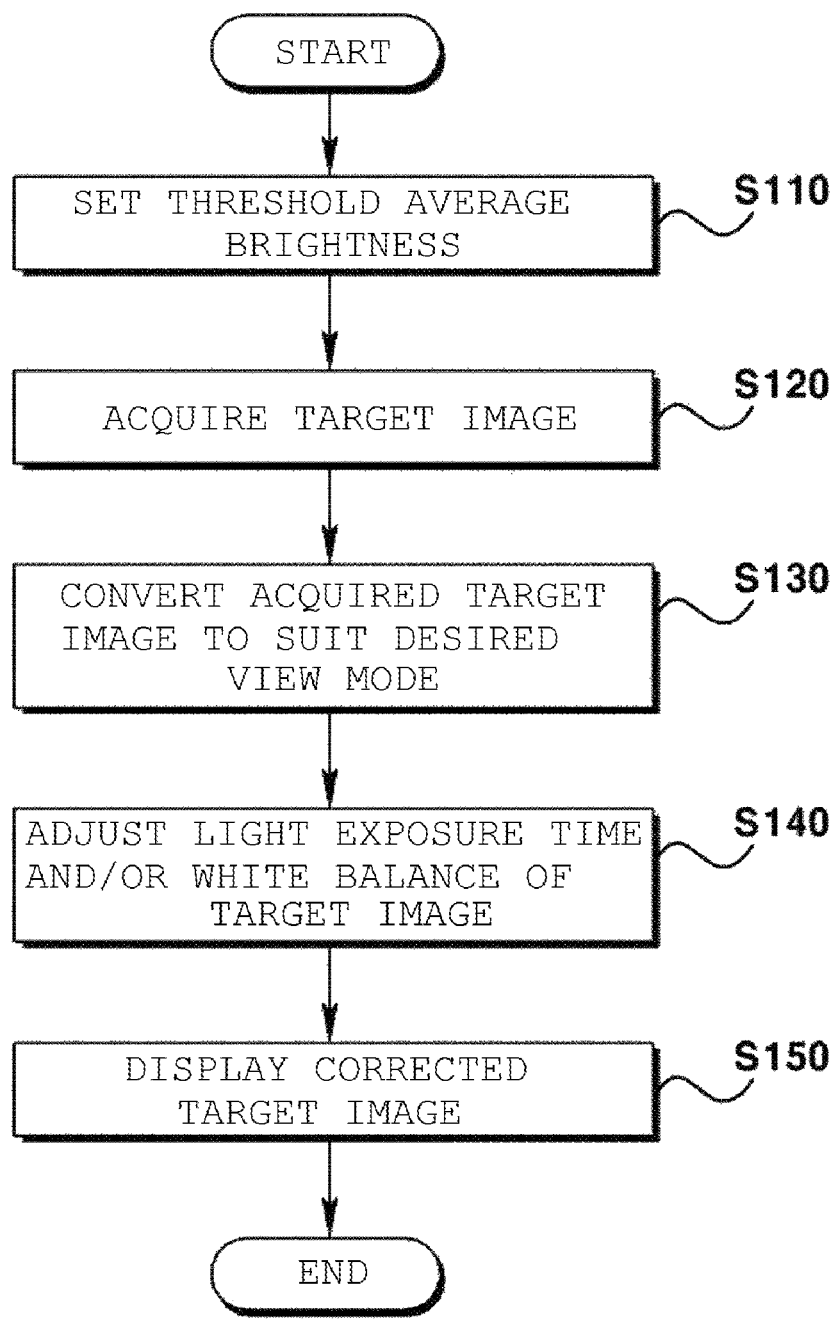
[FIG. 11]

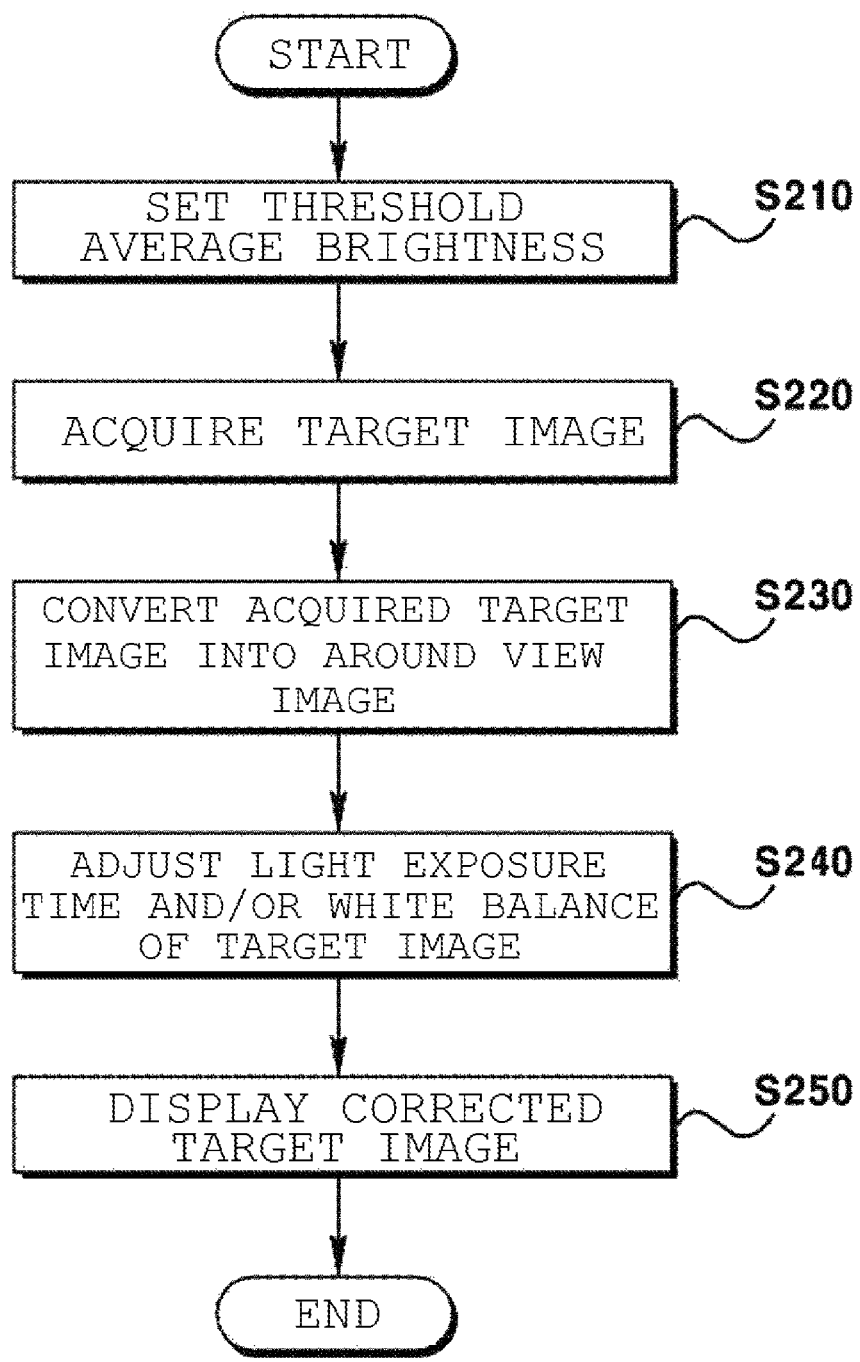
[FIG. 12]

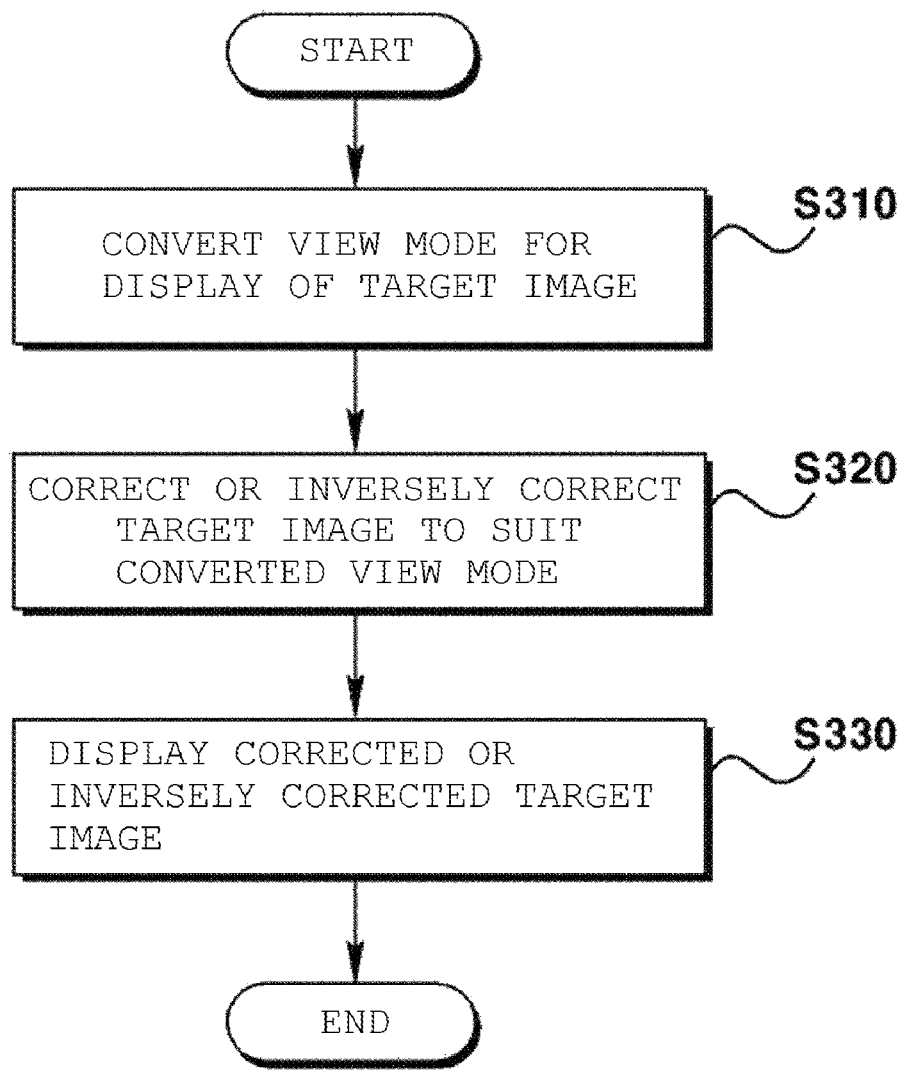
[FIG. 13]

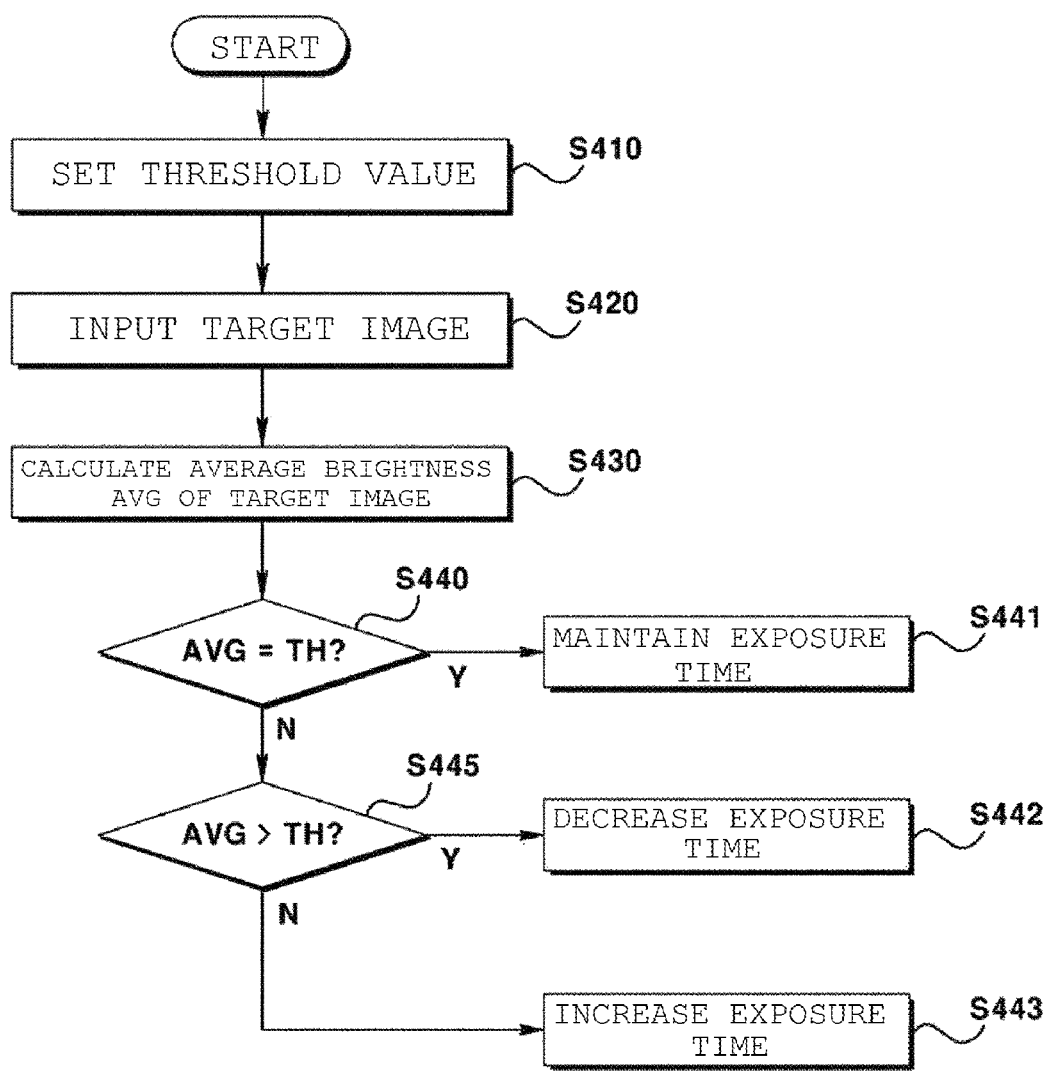
[FIG. 14]

IMAGE PROCESSING METHOD AND DEVICE SUPPORTING MULTIPLE MODES AND IMPROVED BRIGHTNESS UNIFORMITY, IMAGE CONVERSION OR STITCHING UNIT, AND COMPUTER READABLE RECORDING MEDIUM REALIZING THE IMAGE PROCESSING METHOD

CROSS REFERENCE TO RELATED APPLICATIONS

This application is the National Phase of PCT International Application No. PCT/KR2017/009674, filed on Sep. 5, 2017, which claims priority under 35 U.S.C. 119(a) to Patent Application Nos. 10-2016-0115912, filed in the Republic of Korea on Sep. 8, 2016, 10-2016-0115913, filed in the Republic of Korea on Sep. 8, 2016, 10-2016-0165383, filed in the Republic of Korea on Dec. 6, 2016, and 10-2016-0165385, filed in the Republic of Korea on Dec. 6, 2016, all of which are hereby expressly incorporated by reference into the present application.

TECHNICAL FIELD

Embodiments relate to a method of displaying an image in a multi-view mode, and, more particularly, a method of displaying an image acquired by at least one image acquisition unit and an around view image generated using the same in a multi-view mode for around view monitoring (AVM).

BACKGROUND ART

As rapid increase in traffic accidents has come to the fore as a social issue due to increase in number of vehicles and increase in volume of traffic, research into a driver assistance system capable of preventing accidents has been conducted. The driver assistance system refers to a system assisting a driver during driving or parking, for safe driving of the driver.

The driver assistance system essentially includes a device for providing image information such that a driver grasps an external situation of a vehicle in a state of being seated on a driver's seat. In addition, the device for providing the image information includes a camera.

In order to provide the image information to the driver, a plurality of cameras oriented in various directions may be provided outside the vehicle. When the images acquired by the cameras are provided to the driver, the acquired images may be differently converted according to various view modes and provided to the driver.

However, in the related art, the provided images tend to be corrected not based on an image according to a view mode displayed on a display screen capable of being visually confirmed by the driver. Such tendency may also be found in an image for an around view monitoring (AVM) system.

Recently, the around view monitoring system has been actively researched in order to install several cameras to provide the surrounding situations of a vehicle to a driver. Several automobile companies in Germany and Japan have already developed and launched around view monitoring systems. In recent years, systems for providing a bird's eye view to a driver using multiple cameras installed therein have become mainstreamed.

The around view monitoring system may generate an image displaying the surroundings of an object, for example, a vehicle, at a viewing angle of 360 degrees using images acquired by a limited number of cameras through a device for providing image information. At this time, a lens installed in the camera may be a fisheye lens or a wide-angle lens similar thereto in order to obtain a wide viewing angle. However, images acquired by the lens are different from images based on human vision and an image to be finally output is a top-view image as compared to the directions of the camera lenses installed on the vehicle. Therefore, the images acquired by the plurality of cameras need to undergo various forms of image signal processing.

Such a series of processes is necessary because a camera cannot be installed on a vehicle such that the image of the roof of the vehicle is captured in front.

FIGS. 1 and 2 show images based on the related art. Referring to FIGS. 1 and 2, the image of FIG. 1 is the image acquired by a camera installed on a right side of a vehicle and the image of FIG. 2 is an around view image including a left image. The ratio of a dark region due to the shadow of the vehicle to a bright region due to illumination in the image of FIG. 1 is different from that of the around view image. Therefore, due to saturation of brightness of the bright region due to the illumination, white light appears in the image of FIG. 2. This is a result of adjusting light exposure or white balance based on the image of FIG. 1.

DISCLOSURE

Technical Problem

Embodiments provide an image processing method and device supporting multiple modes, image conversion or stitching unit, and computer readable recording medium realizing the image processing method of correcting an image displayed in a specific view mode to be appropriately displayed in the corresponding view mode and displaying the corrected image in the corresponding view mode.

Technical Solution

An image processing method according to an embodiment, in a method of displaying a target image using an image acquired by at least one camera according to a plurality of modes, may include changing an output image from a first target image of a first mode to a second target image of a second mode to output the second target image of the second mode as the first mode is changed to the second mode; and adjusting brightness of the second target image based on the second target image.

An image processing method supporting multiple modes according to another embodiment may include outputting a target image by determining whether to convert or stitch at least one received image in correspondence with user input and converting or stitching the at least one received image depending on whether to convert or stitch the at least one received image; extracting brightness information from the target image; and applying an adjustment value corresponding to the brightness information to conversion or stitching of the at least one image.

In addition, the image processing method supporting the multiple modes may further include adjusting an exposure time of at least one camera device based on the target image, and the adjustment value may be changed according to the brightness information and the exposure time.

In addition, the image processing method supporting the multiple modes may further include receiving at least one image datum acquired from the at least one camera device.

In addition, when the at least one image datum is received in a Bayer pattern, the image processing method supporting the multiple modes may further include performing color interpolation and first image processing with respect to the Bayer pattern to output an image.

In addition, first image processing may include performing at least one of calibration, lens distortion correction, color correction, gamma correction, color space conversion, and edge enhancement.

In addition, the outputting of the target image may include selecting at least one of the at least one image depending on whether to perform conversion or stitching; generating a converted image obtained by removing perspective from the selected image; extracting data corresponding to a region to be inserted into the target image from the converted image; placing the extracted data in the target image; and transmitting the target image to a display device.

The converted image may be obtained by performing inverse perspective mapping transform.

Inverse perspective image transform and placement in the target image may be performed together through a lookup table.

In addition, the applying of the adjustment value to conversion or stitching of the at least one image may include converting at least some data arranged in the lookup table in a bundle.

In addition, the at least one image may be received from at least one camera device installed on a vehicle and user input may be received through an interface installed in the vehicle.

In addition, the at least one image is image information of at least one of the front, rear, left, or right side of the vehicle and user input may include selection of at least one of a top view, a front view, a rear view, a left view, a right view, or a combination thereof.

In addition, at least one lookup table discriminated in correspondence with image information may be included, and at least one lookup table may include a weight corresponding to image information.

A computer-readable recording medium according to another embodiment may have recorded therein an application program for realizing the above-described image processing method supporting the multiple modes through execution of the processor.

An image conversion or stitching device according to still another embodiment may include a processing system including at least one processor and at least one memory device for storing a computer program, and the processing system may perform a step of determining whether image conversion or stitching device converts or stitches at least one received image in correspondence with user input, and converting or stitching the at least one received image depending on whether to convert or stitch the at least one received image, to output a target image; a step of extracting brightness information from the target image; and a step of applying an adjustment value corresponding to the brightness information to conversion or stitching of the at least one image.

In addition, the processing system may make the image conversion or stitching device further to perform a step of adjusting an exposure time of at least one camera device based on the target image, and the adjustment value may support the multiple modes changed according to the brightness information and the exposure time.

In addition, the processing system may make the image conversion or stitching device further to perform a step of receiving at least one image datum acquired from the at least one camera device.

In addition, when the at least one image datum is received in a Bayer pattern, the processing system may make the image conversion or stitching device further to perform a step of performing color interpolation and first image processing with respect to the Bayer pattern to output an image.

In addition, first image processing may include performing at least one of calibration, lens distortion correction, color correction, gamma correction, color space conversion, or edge enhancement.

In addition, the outputting of the target image may include selecting at least one of the at least one image depending on whether to perform conversion or stitching; generating a converted image obtained by removing perspective from the selected image; extracting data corresponding to a region to be inserted into the target image from the converted image; placing the extracted data in the target image; and transmitting the target image to a display device.

The converted image may be obtained by performing inverse perspective mapping transform.

Inverse perspective image transform and placement in the target image may together be performed through a lookup table.

In addition, the applying of the adjustment value to convert or stitch the at least one image may include converting at least some data arranged in the lookup table in a bundle.

In addition, the at least one image may be transmitted from at least one camera device installed on a vehicle and user input may be received through an interface installed in the vehicle.

In addition, the at least one image is image information of at least one of the front, rear, left, or right side of the vehicle, and user input may include selection of at least one of a top view, a front view, a rear view, a left view, a right view, or a combination thereof.

In addition, at least one lookup table discriminated in correspondence with each image information may be included, and at least one lookup table may include a weight corresponding to image information.

An image processing method according to still another embodiment may include a conversion or stitching unit configured to output a target image by converting or stitching at least one image in correspondence with user input; a brightness controller configured to receive brightness information of the target image to output an adjustment value for updating a lookup table in the conversion or stitching unit; and an adjuster configured to receive the brightness information and output a control signal for adjusting an exposure time of at least one camera device.

In addition, the image processing device may further include an image processor configured to selectively perform an operation such as color interpolation or demosaicing, calibration, lens distortion correction, color correction, gamma correction, color space conversion and edge enhancement with respect to a Bayer pattern transmitted from at least one camera device to output the at least one image.

The adjuster may transmit, to the brightness controller, the amount of change or the rate of change occurring in adjustment of the exposure time of at least one camera device, and the brightness controller may determine the adjustment value based on the rate of change and the brightness information.

In addition, the at least one image is image information on at least one of the front, rear, left, or right side of the vehicle, and user input may include selection of at least one of a top view, a front view, a rear view, a left view, a right view, or a combination thereof.

A method of displaying an image in a multi-view mode according to still another embodiment, in a method of displaying target images acquired by at least one image acquisition unit in a plurality of output modes, may include adjusting brightness of a target image converted to be output in a desired output mode among the plurality of output modes; and displaying the target image with adjusted white balance.

A method of displaying an image in a multi-view mode according to still another embodiment, in a method of displaying target images acquired by at least one image acquisition unit in a plurality of output modes, may include adjusting a light exposure time of the image acquisition unit using a target image converted to be output in a desired output mode among the plurality of output modes; and displaying the target images acquired by adjustment.

A method of displaying an image in a multi-view mode according to still another embodiment, in a method of displaying target images acquired by at least one image acquisition unit in a plurality of output modes, may include adjusting white balance of a target image converted to be output in a desired output mode among the plurality of output modes; and displaying the target image with adjusted white balance.

The aspects of the present disclosure are only a part of the preferred embodiments, and various embodiments based on technical features of the present disclosure may be devised and understood by the person with ordinary skill in the art based on the detailed description of the present disclosure.

Advantageous Effects

The device according to embodiments has the following effects.

Embodiments may provide a user with an image corrected to be suitable for a specific view mode.

Embodiments may reduce computation and time required to convert and process an image transmitted from at least one camera device in correspondence with the user input and reduce image quality deterioration.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

FIGS. 1 and 2 are views showing images based on the related art.

FIG. 3 is a view illustrating a method of processing an image in a multi-view mode.

FIG. 4 is a view illustrating a first example of an image processing system in a multi-view mode.

FIG. 5 is a view illustrating a second example of an image processing system in a multi-view mode.

FIG. 6 is a schematic block diagram of an image display device 100 for performing a method of displaying an image in a multi-view mode according to an embodiment.

FIG. 7 shows images displayed by the image display device 100, wherein (a) is a front view, (b) is a right side view, (c) is a rear view, and (d) is a left side view in an actual view mode.

FIG. 8 is a front view (a) of an image converted into an image to be displayed in a top view mode among images acquired by an image acquisition unit 110.

FIG. 9 is a view showing an around view image generated using four images of FIG. 7.

FIG. 10 is a front view of a vehicle for explaining a difference between an actual view mode and a top view mode.

FIG. 11 is a flowchart illustrating a method of displaying an image in a multi-view mode according to another embodiment.

FIG. 12 is a flowchart illustrating a method of displaying an image in a multi-view mode according to still another embodiment.

FIG. 13 is a flowchart illustrating a method of displaying an image in a multi-view mode according to still another embodiment.

FIG. 14 is a flowchart illustrating a method of displaying an image in a multi-view mode according to still another embodiment.

BEST MODE

While the present disclosure may have various embodiments by making various modifications, specific embodiments thereof are shown by way of example in the drawings and will herein be described in detail. It should be understood, however, that the disclosure is not intended to be limited to the specific embodiments, but includes all modifications, equivalents, and alternatives within the spirit and scope of the disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. The term and/or includes a combination of a plurality of related items or any one of a plurality of related items.

It will be understood that when an element is referred to as being "connected to" another element, the element can be directly connected to the other element or intervening elements may also be present. In contrast, when an element is referred to as being "directly connected to" another element, there are no intervening elements present.

The terminology used in the present disclosure is for the purpose of describing particular embodiments only and is not intended to limit the disclosure. A singular representation may include a plural representation unless context clearly indicates otherwise. It will be further understood that the terms "have" and "include" signify the presence of a specific feature, number, step, operation, component, or part, or combinations thereof, not excluding the presence or addition of one or more other features, numbers, steps, operations, components, or parts, or combinations thereof.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the present disclosure will be described in detail by explaining exemplary embodiments with reference to the attached drawings. To facilitate understanding of the present disclosure, like reference numerals in the drawings denote like elements.

FIG. 3 is a view illustrating a method of processing an image in a multi-view mode.

Referring to FIG. 3, the method of processing the image in the multi-view mode may include step 12 of determining whether to convert or stitch at least one image in correspondence with user input, step 14 of collecting brightness information in an extraction region of the at least one image to determine a correction threshold, and step 15 of performing conversion or stitching after correcting the at least one image according to the correction threshold.

In addition, the method of processing the image in the multi-view mode may further include step 16 of adjusting an exposure time of at least one camera device based on a target image and step 18 of applying a variable corresponding to the extracted brightness information and information on the adjusted exposure time to image conversion or stitching. In this case, the correction threshold may be changed according to the brightness information and the exposure time. At least one camera, the exposure time of which is adjusted, may be a camera for capturing an image to be placed in the target image. For example, if the target image is composed of an image captured by one camera, that is, a first camera, the exposure time of the first camera may be adjusted. Alternatively, if the target image is composed of images captured by two or more cameras including a first camera and a second camera, the exposure times of the two or more cameras including the first camera and the second camera may be adjusted. The exposure time of a single camera or at least one camera may be changed in consideration of a region in which an image captured by the single camera or at least one camera is output in the target image. In particular, when the output target image is changed according to mode change, a portion configuring the target image in the image captured by each camera may be changed and the exposure time may be adjusted considering this.

In addition, the method of processing the image in the multi-view mode may further include step 10 of receiving at least one image datum acquired by each of at least one camera device. For example, at least one camera device may include a camera installed on a vehicle. Imaging apparatuses capable of photographing at least one of the front, rear, right side, or left side of the vehicle may acquire peripheral information of the vehicle. In some embodiments, such at least one camera device may output image data composed of a Bayer pattern.

In general, the camera device includes an image sensor for converting an optical signal received through a path formed through at least one lens into an electrical signal. Such an image sensor includes pixels disposed to form a pattern for each color. For example, the image sensor has R, G and B color filters disposed on monochromic pixel cells corresponding in number to the number of pixels with a specific pattern. The R, G and B color patterns are arranged to cross according to the visual characteristics of a user (i.e., human), which is called a Bayer pattern. Each pattern is a monochromic pixel for sensing only brightness of black and white, not sensing a color. When data having such a pattern is output, an image having several colors may be obtained through color interpolation or demosaicing.

The amount of data of the Bayer pattern is significantly less than that of the image data. Accordingly, since the amount of data transmitted by an in-vehicle communication network may be reduced, even in an autonomous vehicle, it is possible to eliminate problems generated by a communication method, a communication speed, etc. in analysis of the peripheral information acquired by at least one camera device disposed on the vehicle.

If at least one image datum is received in a Bayer pattern, the method of processing the image in the multi-view mode may further include a step of performing color interpolation and first image processing with respect to the Bayer pattern to output an image. Here, first image processing may include at least one of color correction, gamma correction, color space conversion, or edge enhancement.

In some embodiments, each camera device installed on the vehicle may output data in the form of an image after performing color interpolation and first image processing with respect to the Bayer pattern output from the image sensor. In this case, it is not necessary for the image processing device does to perform color interpolation and first image processing.

Although not shown, step 15 of converting or stitching at least one image to output a target image may include selecting at least one image depending on whether to perform conversion or stitching, performing calibration, lens distortion correction or operation of generating a converted image obtained by removing perspective from the selected image, extracting data corresponding to a region to be inserted into a target image from the converted image, placing the extracted data in the target image, and transmitting the target image to a display device.

In order to convert the image acquired by a camera module installed on the vehicle into a top-view image, it is necessary to remove perspective effect on objects and thing from the image. In a process of converting or stitching at least one image, the converted image may be generated by removing perspective from the image obtained through the camera device installed on the vehicle. For example, such a converted image may be obtained by performing inverse perspective mapping transform.

The process of converting the image and the process of converting or stitching at least two images, that is, inverse perspective image transform and placement in the target image, may be together performed through a lookup table. Using the height and angle of the camera installed on the vehicle and information on the horizontal and vertical angles of view of the camera, a relationship between an image plane acquired through the camera and an actual plane (a top-view target image plane) to be displayed to the driver or the user may be known. In addition, since the camera device mounted on the vehicle is fixed, when the image acquired by at least one camera device is converted or stitched, a converted or stitched region may be predetermined. Accordingly, when such information is summarized in the form of a lookup table, it is possible to shorten conversion, and computation and time for conversion or stitching.

Meanwhile, step 18 of applying the adjustment value to conversion or stitching of at least one image may include converting at least some data arranged in the lookup table in a bundle. Since the converted or stitched images are acquired by cameras disposed at different positions and the image of an object is captured in different directions, the amounts of light differ between the images. If the cameras individually adjust brightness as in the related art, image information capable of being received by the image processing device may be continuously changed and computation for correcting this may not be reduced. Accordingly, by collecting brightness information from the converted or stitched images to adjust the exposure times of the camera devices based on the brightness information and adjusting data in the lookup table used to convert or stitch at least one image, it is possible to obtain a resulting image with better quality.

As described above, at least one image may be transmitted from at least one camera device installed on the vehicle and input of the user or the driver may be received through an interface installed in the vehicle. For example, the user or the driver may select information on a desired direction or space through an interface capable of being manipulated by the user or the driver while driving, such as a head unit or a multimedia device (audio-video-navigation device) of the vehicle.

For example, at least one image is image information of at least one of the front, rear, left side, or right side of the vehicle and user input may include at least one of a top view, a front view, a rear view, a left view and a right view, or a combination thereof. For example, when the user desires a top view and a front view, the image processing device may convert or stitch the image information of at least one of the front, rear, left side, or right side in order to output the top-view image, and information on the front camera may be output as the front view. In this case, the top view and the front view may have different brightnesses, because information displayed to the user is different and the images configuring the corresponding information are different.

In addition, a region extracted for the target image, which will be output, of the image information acquired by each camera may be changed in correspondence with user input. For example, when a user desires a front view, a large portion of the image information acquired by the camera collecting the front information may be displayed to the user. However, when a user desires a top view, a relatively small portion of the image information acquired by the camera collecting the front information may be displayed to the user. That is, depending on which image the user desires to view, the image of which camera is used is changed or a region, which is extracted to be displayed to the user, of the image acquired by a specific camera is changed. Accordingly, when the image is converted or stitched in consideration of the brightness of the image of the region actually provided to the user, that is, the region extracted from at least one image for conversion or stitching, it is possible to provide an image with higher quality to the user.

Meanwhile, if the exposure time of at least one camera is controlled using the brightness information of the top-view image for which at least one image is converted or stitched, it is possible to reduce a brightness difference according to multiple views.

Meanwhile, the image processing apparatus may include at least one lookup table discriminated in correspondence with each image information, and the at least one lookup table may include a weight corresponding to image information. This may be necessary because the camera devices photograph an object in different directions and thus the amounts of light differ between images.

FIG. 4 is a view illustrating a first example of an image processing system in a multi-view mode.

Referring to FIG. 4, the image processing system may include a camera device 30, an image processing device 40, and a vehicle multimedia device 20.

The camera device 30 may include a lens assembly 32 including at least one lens collecting an incoming optical signal and an image sensor 34 for converting the optical signal collected through the lens assembly 32 into an electrical signal to output a Bayer pattern BP. The camera device 30 may transmit the Bayer pattern BP output from the image sensor 34 to the image processing device 40 without any operation such as color interpolation or image correction.

The image processing device 40 may include an image processor 42 for selectively performing operations such as color interpolation or demosaicing, color correction, gamma correction, color space conversion, and edge enhancement with respect to the Bayer pattern BP received from the camera device 30, a conversion or stitching unit 44 for converting or stitching at least one image CI output from the image processor 42 to output a target image OI, a brightness controller 48 for receiving image information (e.g., brightness information BI) of the target image OI output from the conversion or stitching unit 44 and outputting a variable and an adjustment value LC0 for updating the lookup table in the conversion or stitching unit 44, and an adjuster 46 for receiving the image information (e.g., brightness information BI) of the target image OI output from the conversion or stitching unit 44 to output a control signal ETC for adjusting the exposure time of at least one image camera device 30.

The adjuster 46 may transmit, to the brightness controller 48, the amount of change or the rate of change ETR occurring in adjustment of the exposure time of at least one camera device 30. The brightness controller 48 may determine the adjustment value LC0 based on the image information (e.g., brightness information BI) of the target image OI and the rate of change ETR.

Meanwhile, the conversion or stitching unit 44 may receive a mode control signal VC for a view mode (e.g., at least one of a top view, a front view, a rear view, a left view, a right view, or a combination thereof) desired by the user through a user interface 22 of the vehicle multimedia device 20. The conversion or stitching unit 44 may select and convert or stitch image, which needs to be converted or stitched, of at least one image, in correspondence with user input.

The conversion or stitching unit 44 may perform at least one of calibration, lens distortion correction and operation of generating a converted image obtained by removing perspective from an image. For example, in order to convert the image acquired by the camera module installed on the vehicle into a top-view image, it is necessary to remove the perspective effect of objects and thing in the image. Using the height and angle of the camera installed on the vehicle and information on the horizontal and vertical angles of view of the camera, the relationship between an image plane acquired through the camera and an actual plane (a top-view target image plane) to be displayed to the driver or the user may be confirmed. Using such a relationship, the image plane acquired by the camera may be converted into a plane to be displayed to the user.

In addition, the vehicle multimedia device 20 may include a display device 24 capable of displaying the target image OI received from the conversion or stitching unit 44 to the user or the driver.

FIG. 5 is a view illustrating a second example of an image processing system in a multi-view mode.

Referring to FIG. 5, the image processing system may include a camera device 50, an image processing device 60, and a vehicle multimedia device 20. The image processing system described in FIG. 5 may be similar to the image processing system described in FIG. 4. Hereinafter, a difference therebetween will be focused upon.

The camera device 50 may include a lens assembly 32 including at least one lens collecting an incoming optical signal and an image sensor 34 for converting the optical signal collected through the lens assembly 32 into an electrical signal to output a Bayer pattern BP, and may output an image I-I by performing operation such as color interpolation or image correction with respect to the Bayer pattern BP output from the image sensor 34.

The image processing device 60 for receiving at least one image I-I may include a conversion or stitching unit 44, a brightness controller 48, and an adjuster 46. Here, the conversion or stitching unit 44, the brightness controller 48, and the adjuster 46 may operate similarly to those described in FIG. 3.

In addition, the vehicle multimedia device 20 may include a user interface 24 and a display 22 and may operate similarly to those described in FIG. 4.

FIG. 6 is a schematic block diagram of an image display device 100 for performing a method of displaying an image in a multi-view mode according to an embodiment.

Referring to FIG. 6, the image display device 100 may include an image acquisition unit 110, an image converter 120, a controller 130, an image correction unit 140, and an output unit 150 and may further include a memory 160.

The image acquisition unit 110 acquires a digital image using an image sensor. Here, the digital image acquired to be displayed through the output unit 150 is referred to as a target image. The image acquisition unit 110 may be implemented in the form of a camera independently installed to photograph a subject or a camera module installed in an arbitrary device as a part. In particular, the image acquisition unit 110 is preferably installed on an external surface of the vehicle to photograph a view including the ground on which the vehicle is positioned in the traveling direction, the right direction, the reverse direction, and the left direction of the vehicle in the form of the camera module.

The image converter 120 receives the target image acquired by the image acquisition unit 110 and converts the target image into an image suiting a view mode, that is, an image suitable for a view mode. Here, the view mode means a mode according to a viewpoint (time) changed according to change of an output mode.

All target images acquired by the image acquisition unit 110 are not necessarily converted through the image converter 120. Conversion of the target image means conversion of the target image according to change of the view mode. For example, conversion of the image means that the target image acquired by the image acquisition unit 110 installed on the rear surface of a vehicle is converted into an image acquired by a virtual image acquisition unit 110 installed at a certain height from the vehicle, that is, an image in a top-view mode. Accordingly, when the target image acquired by the image acquisition unit 110 is output in an actual view mode, it is not necessary to separately convert the target image. Here, the actual view mode means that the viewpoint (time) is not changed. That is, the actual view mode means that the target image acquired by the image acquisition unit 110 at a specific position is intactly output without conversion.

The controller 130 may control the image acquisition unit 110 in order to adjust parameters indicating attributes of the target image based on the attributes of the target image acquired by the image acquisition unit 110 or the target image converted by the image converter 120. For example, the controller 130 may adjust a degree of light exposure of a camera provided in the image converter 110 based on predetermined threshold average brightness TH using average brightness AVG of the converted target image. Here, the threshold average brightness means average brightness of a threshold image compared with the average brightness of the target image. Adjustment of light exposure may be adjustment of an exposure time and may be achieved by adjusting an aperture or a shutter speed of the camera of the image acquisition unit 110. As a result, by such adjustment, it is possible to adjust a charge accumulation time and gain of a photodiode.

The image correction unit 140 may correct the image acquired by the image acquisition unit 110 or the target image converted by the image converter 120 to suit the view mode. For example, the image correction unit 140 may adjust the white balance of the target image based on predetermined average brightness TH using the average brightness AVG of the converted target image.

The output unit 150 may output the target image corrected by the image correction unit 140 in the corresponding view mode. The output unit 150 may be implemented by an LCD device, etc. Prior to output, the controller 130 may change an output mode, that is, a view mode.

In addition, the memory 160 may store the threshold average brightness and the average brightness of the target image.

The image converter 120, the controller 130, and the image correction unit 140 may execute a program command stored in the memory 160. The image converter 120, the controller 130 and the image correction unit 140 may mean a central processing unit (CPU), a graphics processing unit (GPU), or a dedicated processor for performing the methods of the embodiments.

In addition, the memory 160 may be composed of a volatile storage medium and/or a non-volatile storage member. For example, the memory 160 may be composed of a read only memory (ROM) and/or a random access memory (RAM).

FIG. 7 shows images displayed by the image display device 100, wherein (a) is a front view, (b) is a right view, (c) is a rear view, and (d) is a left view in an actual view mode.

Referring to FIG. 7, the images corresponding to the front view (a), the right view (b), the rear view (c), and the left view (d) acquired by image display device 100 and, more particularly, the image acquisition unit 110 are shown. The camera modules corresponding to the image acquisition unit 110 may be installed at certain heights on the front, right, rear and left surfaces of the outside of the vehicle. The camera modules may be installed on the radiator grill, right and left indicator lights, and the vehicle trunk lid of the vehicle. The camera modules may be installed such that the lens surfaces are oriented obliquely toward the ground at the installation position. Accordingly, the images shown in FIG. 7 may be seen to be longer than the actual images in the above-described directions.

FIG. 8 is a front view (a) of an image converted into an image to be displayed in a top view mode among images acquired by the image acquisition unit 110. Referring to FIG. 8, it can be seen that the image of the front view (a) converted by the image converter 120 is different from the image of the front view (a) before conversion displayed in the actual view mode of FIG. 7. That is, the image of the top-view mode which is viewed at a certain height from the vehicle is an image corrected to be close to the actual image.

FIG. 9 is a view showing an around view image generated using four images of FIG. 7.

Referring to FIG. 9, the around view image displayed in the top-view mode is shown. As described above, the around view image means an image captured through a virtual camera installed above the vehicle. The around view image is used to display the ground around the vehicle, in which parking lines are mainly displayed, including the roof of the vehicle. Similarly to FIG. 4, the actually captured four target images and the around view image generated based on the same are different from each other. That is, a ratio of the area of a certain region in the actually captured image to an entire area may be changed in the around view mode. In particular, when a target image is acquired using a fisheye lens, the ratio may be more greatly changed. For example, in the drawings of (a) to (d) of FIG. 7, a region under A-2 is closest to the camera and the ratio of the area of the region A-2 occupied in the entire region seems to be high, but is reduced in FIG. 8 showing the actual top-view image.

This means that the attributes of the actually captured target image may be changed even in the image in the around view mode.

FIG. 10 is a front view of a vehicle for explaining a difference between an actual view mode and a top view mode.

Referring to FIG. 10, camera modules installed on the vehicle as the image acquisition unit 100 are shown. The actual camera modules L-1 and R-1 are installed on the left or right indicator lights. The camera modules L-2 and R-2 are virtual camera modules. Referring to FIG. 10, the images acquired by two camera modules may be different from each other due to a difference in angle at which the actual camera modules and the virtual camera modules photograph a subject. By minimizing such a difference, the target images acquired by the actual camera modules may be converted to suit the view mode such that the image output according to the view mode is close to the actual image.

A method of displaying an image in a multi-view mode according to another embodiment will now be described.

FIG. 11 is a flowchart illustrating a method of displaying an image in a multi-view mode according to another embodiment.

First, a threshold value for adjustment may be set and the threshold value may be stored in the memory, etc. (S110).

Next, the image acquisition unit 110 acquires the target image (S120).

Next, the image converter 120 converts the acquired target image to suit a desired output mode, that is, a view mode (S130).

Next, the target image is corrected (S140). The target image may be corrected using two methods. As a result, correction of the target image may be achieved by adjusting the brightness of the target image. As a method, the controller 130 may calculate the average brightness of the target image and light exposure of the camera of the image acquisition unit 110 may be adjusted based on the threshold average brightness using the calculated average brightness of the target image. As another method, the image correction unit 140 may adjust the white balance of the target image based on the threshold average brightness using the average brightness of the target image.

Next, the output unit 150 displays the corrected target image (S150).

Prior to S150, the controller 130 may convert the output mode of the output unit 150. Here, the view mode may be changed by changing the viewpoint in which the target image is output according to change of the output mode. In addition, adjustment of the amount of light of the camera or adjustment of the white balance of the target image may be performed by the number of different view modes in which the target image will be displayed.

FIG. 12 is a flowchart illustrating a method of displaying an image in a multi-view mode according to still another embodiment.

First, a threshold value for adjustment may be set and the threshold value may be stored in the memory, etc. (S210).

Next, the image acquisition unit 110 acquires the target image (S220).

Next, the image converter 120 converts the acquired target image to suit a desired output mode, that is, a view mode and, more particularly, converts the acquired target image into an around view image (S230).

Next, S240 and S250 are equal to S140 and S150 and thus a description thereof will be omitted.

FIG. 13 is a flowchart illustrating a method of displaying an image in a multi-view mode according to still another embodiment.

First, the controller 130 converts the output mode, that is, the view mode, for display of the target image (S310).

Next, the image correction unit 140 corrects or inversely corrects the target image to suit the converted view mode (S320). Here, inverse correction means returning to an uncorrected state. The image correction unit 140 corrects the target image to suit the converted view mode according to conversion of the view mode and may return the corrected target image into the uncorrected target image when the view mode is not converted.

Finally, the output unit 150 displays the corrected or inversely corrected target image.

FIG. 14 is a flowchart illustrating a method of displaying an image in a multi-view mode according to still another embodiment.

In particular, FIG. 14 is a flowchart illustrating adjustment of a light exposure time of the image acquisition unit 110 which may be implemented by a camera module, etc. Referring to FIG. 14, first, a threshold TH value may be preset and the threshold value may be pre-stored in the memory, etc. (S410).

Next, the target image acquired by the image acquisition unit 110 is input to the controller 130 (S420).

Next, the controller 130 calculates the average brightness AVG of the target image (S430).

When the average brightness is equal to the threshold value by comparing the average brightness of the target image with the threshold average brightness (S440), a current exposure time is maintained (S441). In addition, when the average brightness is different from the threshold value (S445) and the average brightness is greater than the threshold value by comparing the average brightness with the reference value (S445), the current exposure time may be decreased by adjustment (S442). When the average brightness is not greater than the threshold value, the current exposure time may be increased by adjustment (S443).

The method of displaying the image in the multi-view mode according to another embodiment may adjust the brightness of the pixels configuring the target image using the weight before converting the acquired target image into an image suitable for the corresponding view mode. Here, each pixel has a fixed weight according to the position of each pixel.

Although the elements are shown as different blocks in FIG. 6 for convenience of description, the elements may be configured as one block. For example, the blocks may be configured as a controller or a processor to perform the above-described series of operations.

As described above, according to the embodiments, it is possible to solve the problems of the related art. That is, by adjusting the brightness of the target image based on the image output in the converted view mode, it is possible to prevent a region, in which brightness is saturated, shown in FIG. 2.

While exemplary embodiments have been described, it will be understood by those skilled in the art that various changes in form and details may be made therein without departing from the spirit and scope of the present disclosure as defined by the appended claims.

The invention claimed is:

1. An image processing method, the image processing method comprising:
   acquiring images from at least two camera devices;
   changing an output image from a first target image of a first mode to a top-view mode, as the first mode is changed to the top-view mode, the first target image including an image from at least one of the at least two camera devices;
   determining extraction regions of the images according to the top-view mode;
   collecting first brightness information on the extraction regions, before performing view point conversion on extraction regions of the images and before performing image stitching on the extraction regions of the images;
   converting and stitching the extraction regions of the images based on conversion information in a lookup table and the first brightness information to generate a top-view stitched and converted target image, the top-view stitched and converted target image being converted to have a different point of view with respect to the at least two camera devices;
   determining an average brightness of the top-view stitched and converted target image;
   comparing the average brightness of the top-view stitched and converted target image to a predetermined threshold value;
   in response to the average brightness of the top-view stitched and converted target image being less than or greater than the predetermined threshold value, adjusting an exposure time of at least one of the two camera devices and adjusting the conversion information in the lookup table to generate an updated lookup table; and
   generating an updated top-view stitched and converted target based on the updated lookup table.

2. The image processing method according to claim 1, further comprising outputting the top-view stitched and converted target image with adjusted brightness.

3. The image processing method according to claim 1, wherein brightness of the top-view stitched and converted target image is adjusted through adjustment of brightness of the images acquired by the at least two camera devices for configuring the top-view stitched and converted target image.

4. The image processing method according to claim 1, wherein the first target image and the top-view stitched and converted target image include an image of a first camera device among the at least two camera devices, and
   wherein an exposure time of the first camera device in the first mode and an exposure time of the first camera device in the top-view mode are different from each other.

5. The image processing method according to claim 1, wherein the first target image and the top-view stitched and converted target image include images of two or more camera devices among the at least two camera devices, and wherein exposure times of the two or more camera devices in the first mode and exposure times of the two or more camera devices in the top-view mode are different from each other.

6. The image processing method according to claim 1, wherein the first target image in the first mode is an image converted or stitched based on the images acquired by the at least two camera devices.

7. The image processing method according to claim 1, wherein at least a portion of the first target image in the first mode overlaps a portion of the top-view stitched and converted target image in the top-view mode.

8. The image processing method according to claim 1, wherein different images composed of an image acquired by any one of the at least two camera devices or at least one image acquired by each of the at least two camera devices are output in the first mode and the top-view mode.

9. An image processing method supporting multiple modes, in a method of displaying a stitched and converted target image, the image processing method comprising:
   acquiring images from at least two camera devices;
   determining extraction regions of the images according to a mode;
   collecting first brightness information on the extraction regions, before performing view point conversion on the images and before performing image stitching on the images;
   converting and stitching the extraction regions of the images based on conversion information in a lookup table and the first brightness information to generate a top-view stitched and converted target image, the top-view stitched and converted target image being converted to have a different point of view with respect to the at least two camera devices;
   determining an average brightness of the top-view stitched and converted target image;
   comparing the average brightness of the top-view stitched and converted target image to a predetermined threshold value;
   in response to the average brightness of the top-view stitched and converted target image being less than or greater than the predetermined threshold value, adjusting an exposure time of at least one of the two camera devices and adjusting the conversion information in the lookup table to generate an updated lookup table; and
   generating an updated top-view stitched and converted target based on the updated lookup table.

10. A non-transitory computer-readable recording medium in which an application program is recorded, the application program realizing the image processing method of claim 1 supporting the multiple modes through execution of a processor.

11. An image conversion and stitching device, comprising:
    a processing system including at least one processor and at least one memory device for storing a computer program,
    wherein the processing system is configured to control the image conversion and stitching device to perform:
    acquiring images from at least two camera devices;
    determining an extraction region in each of the images and determining whether to convert and stitch the images, in correspondence with a user input;
    collecting first brightness information in the extraction region in each of the images, before performing view point conversion on the images and before performing image stitching on the images;

converting and stitching the extraction region of the images based on conversion information in a lookup table and the first brightness information to generate a top-view stitched and converted target image, the top-view stitched and converted target image being converted to have a different point of view with respect to the at least two camera devices;

determining an average brightness of the top-view stitched and converted target image;

comparing the average brightness of the top-view stitched and converted target image to a predetermined threshold value;

in response to the average brightness of the top-view stitched and converted target image being less than or greater than the predetermined threshold value, adjusting an exposure time of at least one of the two camera devices and adjusting the conversion information in the lookup table to generate an updated lookup table; and generating an updated top-view stitched and converted target based on the updated lookup table.

12. The image conversion and stitching device according to claim 11, wherein the lookup table is updated based on the exposure times.

13. The image conversion and stitching device according to claim 11, wherein the processing system is further configured to control the image conversion and stitching device further to receive at least one image datum acquired from the at least two camera devices.

14. The image conversion and stitching device according to claim 13, wherein the processing system is further configured to control the image conversion and stitching device further to perform color interpolation and first image processing with respect to a Bayer pattern to output an image, when the at least one image datum is received in the Bayer pattern.

15. An image processing unit, comprising:
a conversion and stitching unit configured to acquire images from at least two camera devices, determine an extraction region in each of the images and determine whether to convert and stitch the at least one image in correspondence with a user input; and
a brightness controller configured to determine an adjustment value by collecting first brightness information in the extraction region in each of the images,
wherein the conversion and stitching unit is further configured to receive the adjustment value, convert and stich the extraction region of the images based on conversion information in a lookup table and the adjustment value to generate a top-view stitched and converted target image, the top-view stitched and converted target image being converted to have a different point of view with respect to the at least two camera devices,
wherein the image processing unit further includes an adjuster configured to:
determine an average brightness of the top-view stitched and converted target image;
compare the average brightness of the top-view stitched and converted target image to a predetermined threshold value; and
in response to the average brightness of the top-view stitched and converted target image being less than or greater than the predetermined threshold value, adjusting an exposure time of at least one of the two camera devices and adjusting the conversion information in the lookup table to generate an updated lookup table, and
wherein the conversion and stitching unit is further configured to generate an updated top-view stitched and converted target based on the updated lookup table.

16. The image processing unit according to claim 15, further comprising an image processor configured to selectively perform an operation such as color interpolation or demosaicing, color correction, gamma correction, color space conversion, and edge enhancement with respect to a Bayer pattern transmitted from at least one camera device among the at least two camera devices to output the at least one image.

17. The image processing unit according to claim 15, wherein the adjuster transmits, to the brightness controller, an amount of change or a rate of change occurring in adjustment of the exposure times of the at least two camera devices, and
wherein the brightness controller determines the adjustment value based on the amount of change or the rate of change and the second brightness information.

18. The image processing method according to claim 1, further comprising:
in response to the average brightness of the top-view stitched and converted target image being greater than the predetermined threshold value, decreasing the exposure time of the at least one of the two camera devices; and
in response to the average brightness of the top-view stitched and converted target image being less than the predetermined threshold value, increasing the exposure time of the at least one of the two camera devices.

19. The image processing method according to claim 9, further comprising:
in response to the average brightness of the top-view stitched and converted target image being greater than the predetermined threshold value, decreasing the exposure time of the at least one of the two camera devices; and
in response to the average brightness of the top-view stitched and converted target image being less than the predetermined threshold value, increasing the exposure time of the at least one of the two camera devices.

20. The image conversion and stitching device according to claim 11, wherein the processing system is further configured to:
in response to the average brightness of the top-view stitched and converted target image being greater than the predetermined threshold value, decrease the exposure time of the at least one of the two camera devices, and
in response to the average brightness of the top-view stitched and converted target image being less than the predetermined threshold value, increase the exposure time of the at least one of the two camera devices.

* * * * *